(12) United States Patent
    Laurentiu

(10) Patent No.: US 8,639,851 B2
(45) Date of Patent: Jan. 28, 2014

(54) SERIAL BIT PROCESSOR

(75) Inventor: Birsan Laurentiu, Saint Herblain (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/462,746

(22) Filed: May 2, 2012

(65) Prior Publication Data

US 2013/0297831 A1    Nov. 7, 2013

(51) Int. Cl.
    *G06F 3/00* (2006.01)
(52) U.S. Cl.
    USPC .............................................. 710/5
(58) Field of Classification Search
    USPC .............................................. 710/5
    See application file for complete search history.

(56) References Cited

U.S. PATENT DOCUMENTS 6,704,350 B1 *   3/2004   Ryu et al. .................. 375/222

* cited by examiner

*Primary Examiner* — Chun-Kuan Lee
(74) *Attorney, Agent, or Firm* — Fish & Richardson P.C.

(57) ABSTRACT

A serial bit processor is disclosed that configures a timer/counter module to determine a number of data bits to be decoded from a serial bit stream. In some implementations, a serial peripheral is coupled to a timer/counter module. The serial peripheral sends a restart command to reload an internal count register of the timer/counter module with a pre-defined value. The serial peripheral then sends count commands that cause the timer/counter to decrement (or increment) by one each time a count command is received. When the count reaches zero, a compare match command is generated and sent to the serial peripheral where it is used to resume or complete the decoding of data bits from the serial bit stream. In some implementations, a serial peripheral is included in a microcontroller that has an event system. The event system is used to communicate commands between peripherals.

14 Claims, 6 Drawing Sheets

SERIAL BIT PROCESSOR

TECHNICAL FIELD

This disclosure relates generally to electronics and more particularly to universal serial interfaces.

BACKGROUND

A Serial Peripheral Interface (SPI) bus is a synchronous serial data link standard that operates in full duplex mode. Devices communicate in a master/slave mode where the master device initiates the data frame. SPI protocol supports fixed 8-bit word lengths or other word lengths (e.g., 16-bit, 32-bit). It is not possible, however, to support SPI protocols using non-standard data lengths (e.g., 9-bit data length) without an additional timer or I/O pins or software overhead. The same issue is applicable for the Universal Asynchronous Receiver/Transmitter (USART), where protocols based on USART use different data lengths. Two examples are the Local Interconnect Network (LIN) and Digital Addressable Lighting Interface (DALI) buses, which cannot support non-standard data lengths without additional software overhead.

Conventional SPI or USART hardware designs support in-hardware fixed data length settings. In some designs, data length settings can vary a lot (e.g., from 4 bits to 14 or 16). Additionally, specific hardware must be developed to support DALI or LIN protocols. The drawback to these conventional designs is the cost or suboptimal microcontroller architecture for a defined application.

SUMMARY

A serial bit processor is disclosed that configures a timer/counter module to determine a number of data bits from a serial bit stream. In some implementations, a serial peripheral is coupled to a timer/counter module. The serial peripheral sends a restart command to reload an internal count register of the timer/counter module with a pre-defined value. The serial peripheral then sends count commands that cause the timer/counter to decrement (or increment) each time a count command is received (e.g., decrement by one). When the count reaches zero or some other base value, a compare match command is generated and sent to the serial peripheral where it is used to resume or complete the decoding of data bits from the serial bit stream. In some implementations, a serial peripheral is included in a microcontroller that has an event system. The event system is used to communicate commands between peripherals.

Particular implementations of the disclosed serial bit processor provide the following advantages: 1) data frames can have any length; 2) improved bandwidth; 3) faster communication without latency; 4) specific or custom protocols can be implemented without adding expensive logic; 5) reduced gate counts leading to reduced power consumption; 6) pin counts can be reduced for certain applications while keeping available the same number of internal resources; and 7) improved power values by limiting central processing unit (CPU) activity.

The details of one or more disclosed implementations are set forth in the accompanying drawings and the description below. Other features, aspects, and advantages will become apparent from the description, the drawings and the claims.

DETAILED DESCRIPTION

Figure 1:
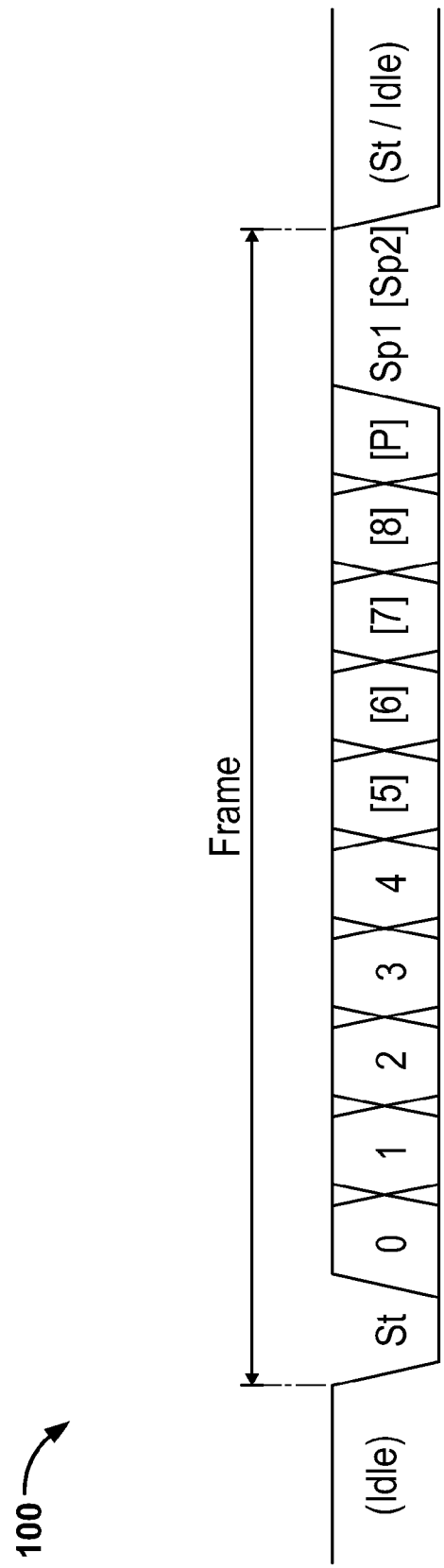
FIG. 1 illustrates a USART frame format.

FIG. 1 illustrates a USART frame format 100 as supported in some commercially available devices. Many standards are based on universal serial interfaces (USI). The most common USIs are USART and SPI. Bits inside brackets are optional. The other bits are defined as follows:

St Start bit, always low, (n) Data bits (8 bits in standard mode and variable for non-standard modes), P Parity bit, odd or even, Sp Stop bit, always high, and IDLE No transfer on the communication line (RxD or TxD). The IDLE state is always high.

With fixed data length implementations, it is not possible to support protocols like LIN or DALI without software overhead or additional hardware or logic. LIN protocol includes a break field, which is one START bit, 12 data bits (level 0) and one STOP bit. All other characters are standard USART frame (one START bit, 8-bit data field, one STOP bit). DALI protocol includes an Address/Command field which is always a USART frame including one START bit, 16-bit data and one STOP bit. These two examples illustrate that many protocols can be based on USART with different data bit length settings.

For SPI, basic support includes a serial transfer of eight data bits. For some sensor or wireless applications, more bits have to be serialized. The most known protocol is a 9-bit SPI, but some serial memories use a higher data length to optimize bandwidth/transfer speed.

Most conventional microcontrollers include USART and SPI modules. There is no standard, however, related to the number of data bits within the frame. On USART, most conventional microcontrollers support between 5 and 9 bits. Several microcontrollers support frames with 4 and 16 bits. In addition, specific hardware blocks have to be developed to support protocols such as LIN and DALI. For SPI, an 8-bit data frame is the most common implementation. Some microcontrollers include 16-bit and 32-bit data frame support for SPI.

Accordingly, conventional microcontrollers support a number of settings for fixed data frame lengths. None of these conventional microcontrollers, however, can provide native variable data length support for a variety of protocols, including protocols with based on SPI and USART that have non-standard data lengths. Having native variable data length support:

Reduces CPU activity, resulting in less power consumption (e.g., may reduce power consumption by at least half)

Reduces the cost of manufacture, including:

Less silicon area is used since no need to develop specific support hardware

Less test time is needed since no additional logic needs to be tested

External components are located on the Printed Circuit Board (PCB)

The required number of pins is reduced since there is no need to signalize externally where or when data is valid or not Any protocol based on USART or SPI can be supported Exemplary Serial Bit Processor A serial bit processor provides native variable data length support for serial communication protocols that is based on USART or SPI. In some implementations, an Intellectual Property (IP) block or IP core is inserted in an existing microcontroller design to support serial communication protocols having variable data lengths.

An example IP block can include four main parts:

A clock generator for calculating a sampling clock

A finite state machine (FSM) to decode data fields within a frame (e.g., START bit, DATA bits, STOP bit, etc.)

A clock/data recovery module for readjusting the sampling point and/or performing a majority vote on sampled data.

Figure 2:
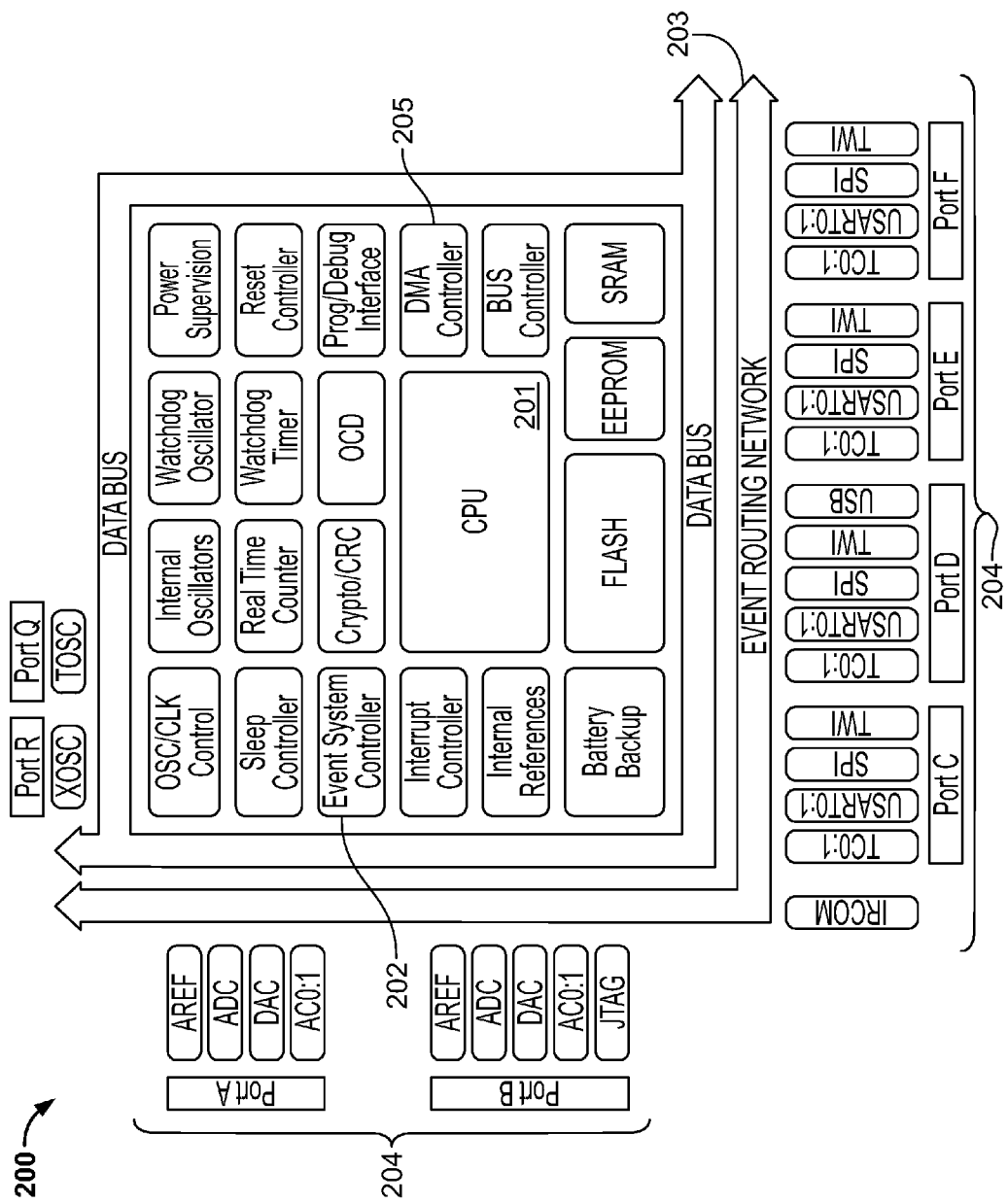
FIGS. 2 and 3 are simplified diagrams of an example event system and relevant interconnected peripherals.

In this example microcontroller design, the IP block can leverage existing hardware and software, such as an event system and direct memory access (DMA) system. An example microcontroller suitable for use with the disclosed implementations is the AVR® Xmega® microcontroller developed and sold by Atmel Corporation of San Jose, Calif. USA. The Xmega® microcontroller includes:

An event system which receives events from peripherals and transfers the events to other peripherals A DMA system for transferring data between memories and peripherals and vice versa, or commands provided by peripherals, the event system or software Peripherals, including SPI, USART and timer/counter modules Exemplary Microcontroller Design with Serial Bit Processor FIG. 2 is a simplified block diagram of an example microcontroller design that includes an event system and interconnected peripherals. In some implementations, microcontroller system 200 includes CPU 201 having various components (e.g., controllers, memory), event system controller 202 for controlling the routing of events from peripherals 204 on event routing network 203 and DMA controller 205 for transferring data between memories (e.g., FLASH, EEPROM, SRAM) and peripherals 204.

Figure 3:
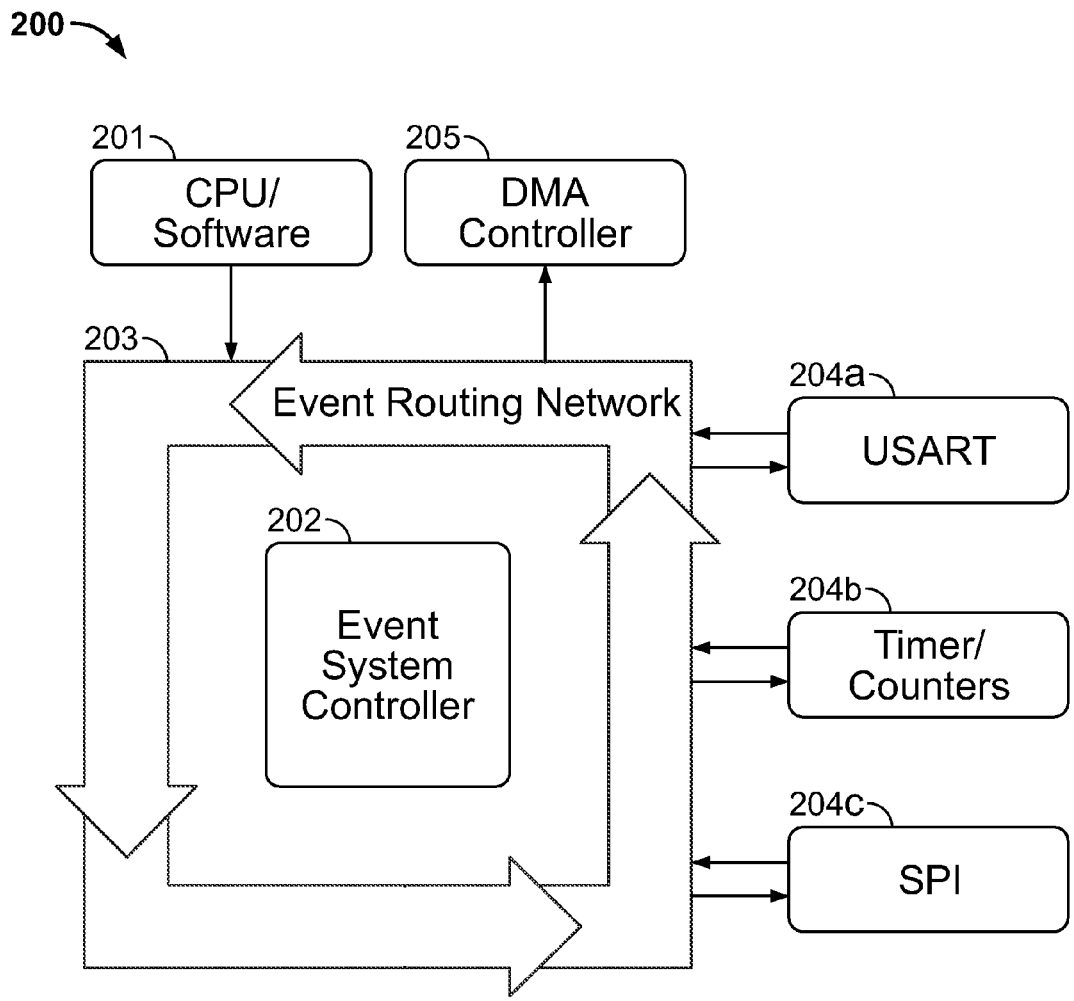

FIG. 3 is a simplified block diagram of the relevant components and peripherals 204 of microcontroller system 100. Event controller 202 and event routing network 203 comprise an event system. The event system receives orders from peripherals 204, such as UART module 204a, timers/counters module 204b and SPI module 204c. Each peripheral 204 decides what type of action has to be done when an event is received on event routing network 203.

Example Timer/Counter

Figure 4:
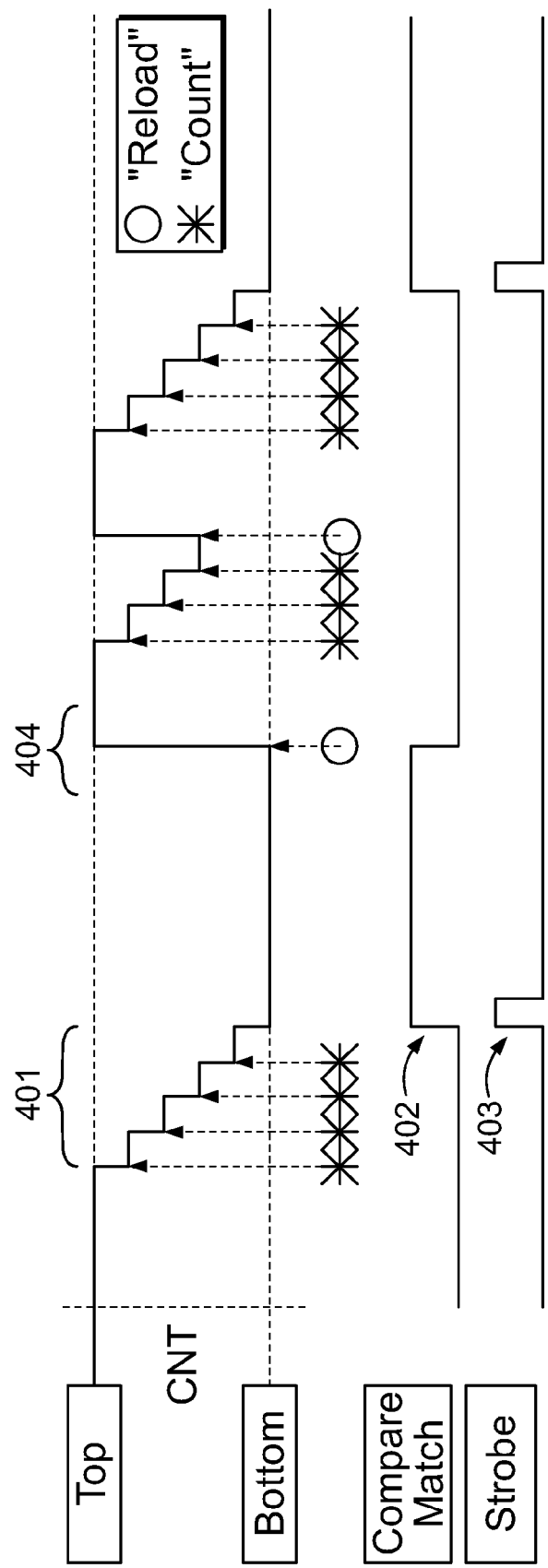
FIG. 4 illustrates an example timer-counter operation and associated events.

FIG. 4 illustrates an example timer-counter operation and associated events. In some implementations, timer/counter module 204b can receive commands from a serial peripheral (e.g., serial peripheral 204a or 204c) or an event system over event routing network 203. The commands can be used by timer/counter module 204b to generate a command that can be used by a clock/data recovery system in the serial peripheral to adjust the decoding of data bits from a serial bit stream. The sampling point can be used as an event for timer/counter module 204b to allow timer/counter module 204b to be synchronized with the incoming asynchronous/synchronous data frame.

Referring to FIG. 4, timer/counter module 204b can increment or decrement. Only a decrement operation is described. Those with skill in the art will recognize that an incrementing operation can be implemented in a manner that is similar to decrementing. In some implementations, timer/counter module 204b has two registers:

TOP register: stores a value that represents the number of bits within the data field of the data frame (e.g., eventual START or STOP bits are not included)

CNT register: stores a value that represents the counter value

When decrementing, the CNT register decrements 401 from TOP to BOTTOM (zero) on each "count" command received from the event system or directly from a serial peripheral. When decrementing or when the CNT is equal to BOTTOM, the CNT register is reloaded 404 with a TOP value in response to a "restart" command received from the event system or directly from a serial peripheral. A "restart" command can have a priority over a "count" command when both commands are received at the same time.

When reaching the BOTTOM, timer/counter module 204b generates 402 a compare match command (outbound command). This command can be generated when the CNT reaches BOTTOM. For example, the counter value can be compared with 0xx00 (all bits zero). If true, then the compare match command is generated.

Additionally, strobe pulse 403 can be generated when a match occurs. Inbound commands "restart" and "count" can be generated by the serial peripheral. The compare match command can be received or "consumed" by the serial peripheral and used to resume or complete decoding of data bits from a serial bit stream.

Example Serial Peripheral

Figure 5:
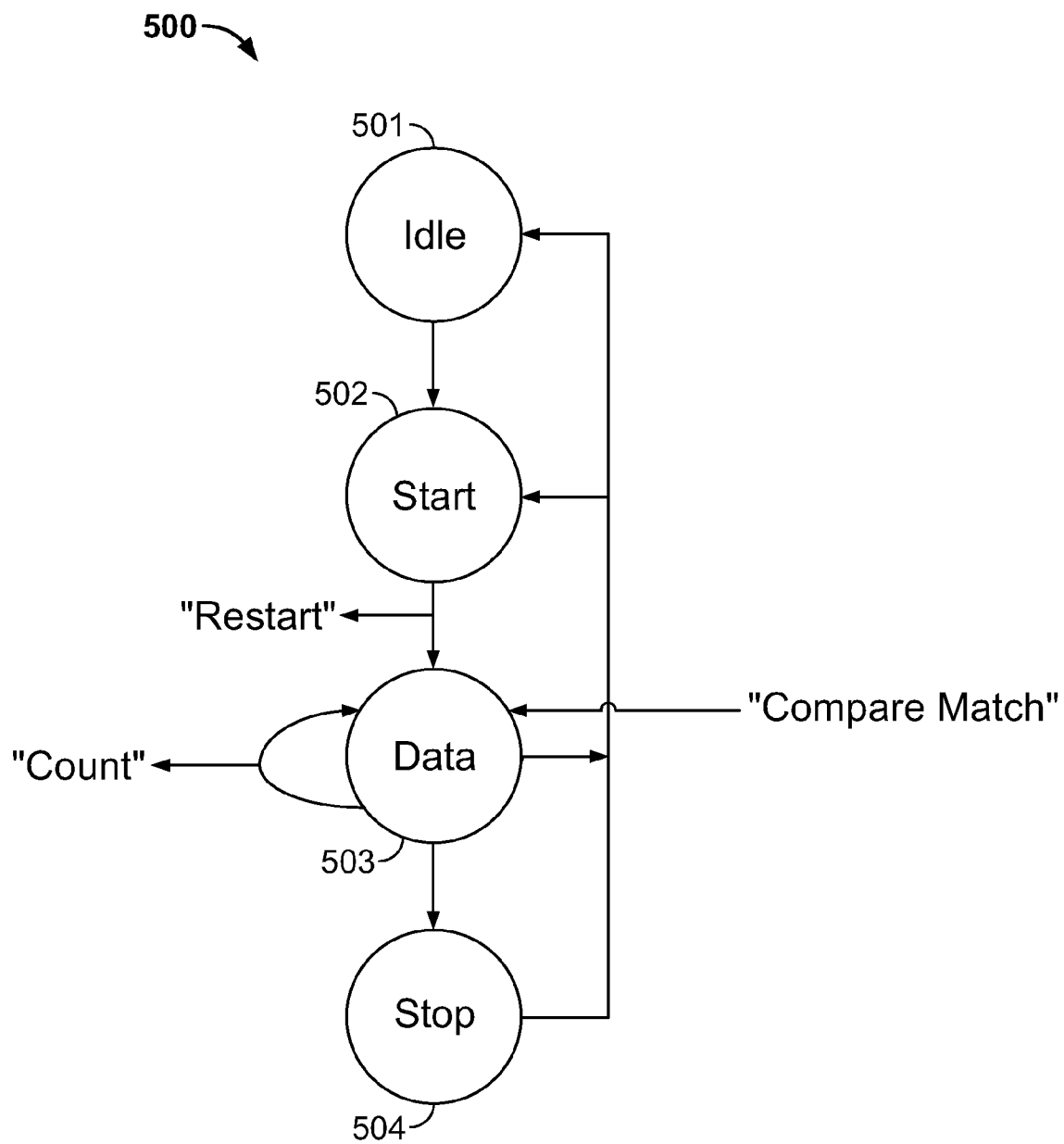
FIG. 5 illustrates an example finite state machine of a serial peripheral.

FIG. 5 illustrates an example finite state machine of a serial peripheral. In some implementations, a finite state machine (FSM) 500 of a serial peripheral can be implemented using four states: IDLE state 501, START state 502, DATA state 503 and STOP state 504. When a transition is detected on a serial bus line (in reception) or CPU 201 gives a command to transmit data, FSM 500 goes from IDLE state 501 to START state 502. After START state 502 is sent/received, FSM 500 enters DATA state 503 and timer/counter module 204b controls the data length. When all data are received/transmitted, FSM 500 enters STOP state 504. The number of data bits transmitted (received) is equal to the data length used by the protocol to transmit data. When all data frames are transmitted (received), FSM 500 returns to its default IDLE state 501. In all other conditions, FSM 500 remains in IDLE state 501. If an error is detected while operating in DATA state 503, FSM 500 can be "forced" back to the default IDLE state 501.

Any condition causing FSM 500 to enter DATA state 503 or leave DATA state 503 results in a "restart" command being sent to timer/counter module 204b. In DATA state 502, the command to shift in or shift out a bit from a shift register results in a "count" command being sent to timer/counter 204b. When FSM 500 is in DATA state 503 and the compare match order is received from timer/counter module 204b, FSM 500 exits DATA state 503. FIG. 5 illustrates the generation and use of the "restart," "count" and "compare match" commands.

Exemplary System Integration

The disclosed implementations allow connection to both an event system of a microcontroller or direct connection between the serial peripheral and timer/controller module. Both configurations work in the same manner. The only difference is that when used with an event system, any internal timer/counter module can be linked to serial peripherals. In addition, when the shifter is empty or full, the serial peripheral can request a DMA transfer. This allows the CPU to be offloaded, reducing system power consumption.

Figure 6A:
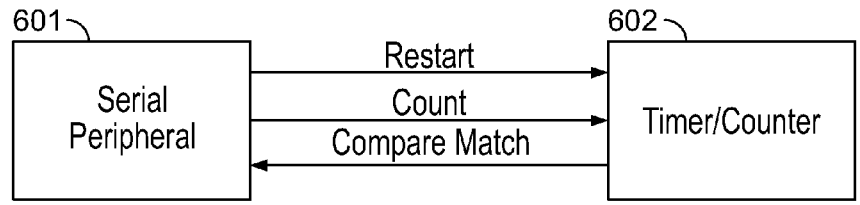
FIG. 6A illustrates a connection between two peripherals without an event system.
Figure 7:
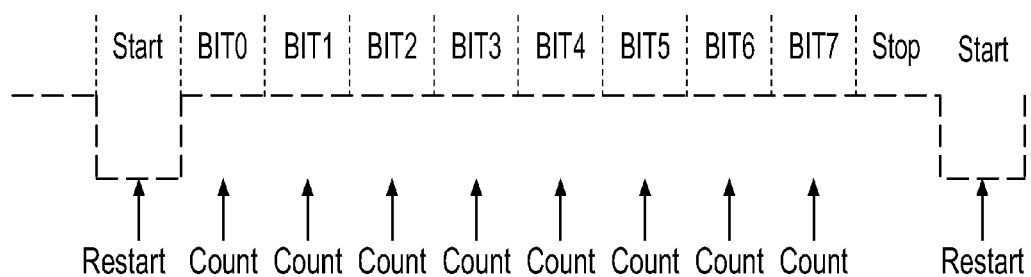
FIG. 7 is a timing diagram illustrating how a standard USART (8-bits of data) is implemented with a peripheral counter.
Figure 7:
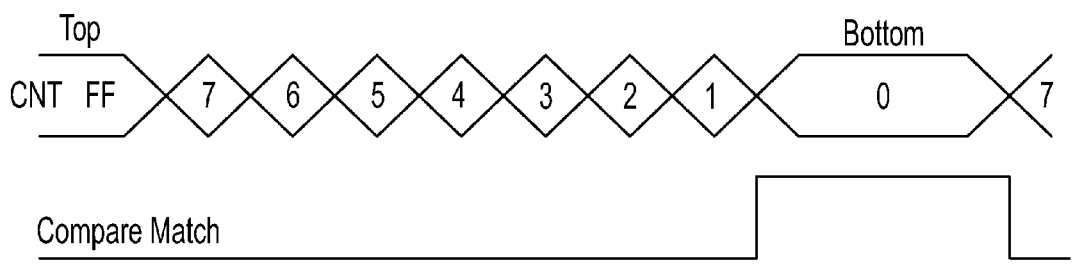

FIG. 6A illustrates a connection between two peripherals without using an event system. In some implementations, serial peripheral 601 is coupled directly to timer/counter module 602. Serial peripheral 601 sends a restart command and count command to timer/counter 602. The "restart" command is used to reload the count value CNT as shown in FIGS. 4 and 7. Each "count" command causes the count CNT (TOP) to be decremented (e.g., decremented by one) until BOTTOM (zero) is reached.

Figure 6B:
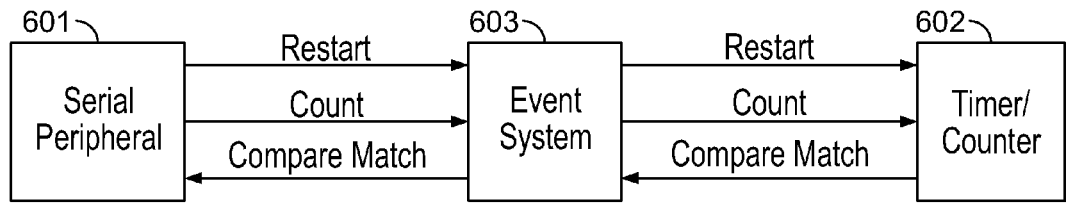
FIG. 6B illustrates a connection between two peripherals with an event system.

FIG. 6B illustrates a connection between two peripherals using an event system. In some implementations, event system 603 is coupled between serial peripheral 601 and timer/counter module 602. Event system 603 is used to route "restart," "count" and "compare match" commands between serial peripheral 601 and timer/counter module, as described in reference to FIGS. 2 and 3.

Referring to FIG. 7, a timer/counter process is illustrated for a standard USART with and 8-bit data field. If the STOP bit is reached when the counter reaches BOTTOM, a compare match command is generated by timer/counter module 602. The compare match command is sent to serial peripheral 601 where it can be used to resume or complete the decoding of data bits from a serial bit stream.

The serial bit processing described above is designed to reduce the amount of software and hardware needed to implement a serial bit processor having a native variable length data field for serial data communications. A user need only set up the USART and SPI modules and the TOP value of timer/counter module 602.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A serial bit processor comprising:
a serial peripheral configured to receive a serial bit stream including data frames having data fields containing data bits; and
a timer/counter module coupled to the serial peripheral and configured to generate an outbound command for use by the serial peripheral to decode the data bits from the data fields, where the outbound command is based on inbound commands provided by the serial peripheral, where the inbound commands control decrementing or incrementing of a timer or counter in the timer/counter module, and a first command of the inbound commands starts or restarts the timer or counter and a second command of the inbound commands causes the timer or counter to decrement or increment.

2. The serial bit processor of claim 1, further comprising:
an event system coupled to the serial peripheral and the timer/counter module and configured to communicate the input commands and the output command between the serial peripheral and the timer/counter module.

3. The serial bit processor of claim 1, where the outbound command is used to control operation of the timer/counter module.

4. The serial bit processor of claim 1, where the timer/counter module can be configured with a count value indicative of a length of the data fields.

5. The serial bit processor of claim 1, where the serial peripheral further comprises:
a finite state machine (FSM) configured to generate the inbound commands provided to the timer/counter module.

6. The serial bit processor of claim 5, where the FSM is configured to receive the outbound command from the timer/counter module and use the outbound command to decode data bits from the serial bit stream.

7. The serial bit processor of claim 6, where the FSM includes a state that generates the first inbound command for starting or restarting the timer or counter in the timer/counter module, and a state that generates the second inbound command for causing the timer or counter to decrement or increment.

8. A method performed by a serial bit processor including a serial peripheral coupled to a timer/counter module, the method comprising:
receiving a serial bit stream including data frames having data fields containing data bits; and
generating an outbound command for use by a serial peripheral to decode the data bits from the data fields, where the command is based on inbound commands provided by a serial peripheral, where the inbound commands control the decrementing or incrementing of a timer or counter in the timer/counter module, and a first command of the inbound commands starts or restarts the timer or counter and a second command of the inbound commands causes the timer or counter to decrement or increment.

9. The serial bit processor of claim 8, further comprising:
an event system coupled to the serial peripheral and the timer/counter module and configured to communicate the input commands and the output command between the serial peripheral and the timer/counter module.

10. The serial bit processor of claim 8 where the outbound command is used to control the operation of the timer/counter module.

11. The serial bit processor of claim 8, where the timer/counter module can be configured with a count value indicative of a length of the data fields.

12. The serial bit processor of claim 8, where the serial peripheral further comprises:
a finite state machine (FSM) configured to generate the inbound commands provided to the timer/counter module.

13. The serial bit processor of claim 12, where the FSM is configured to receive the outbound command from the timer/counter module and use the outbound command to decode data bits from the serial bit stream.

14. The serial bit processor of claim 13, where the FSM includes a state that generates the first inbound command for starting or restarting the timer or counter in the timer/counter module, and a state that generates the second inbound command for causing the timer or counter to decrement or increment.

* * * * *